United States Patent [19]
Duquesne

[11] 3,791,434
[45] Feb. 12, 1974

[54] DEVICE FOR FITTING AND REMOVING OF TIRE WHICH EQUIP THE WHEELS OF MOTOR VEHICLES

[76] Inventor: Victor Duquesne, Quellinstraat 42-44, Antwerpen, Belgium

[22] Filed: Mar. 16, 1972

[21] Appl. No.: 235,353

[30] Foreign Application Priority Data
Mar. 30, 1971  Belgium .............................. 59.915

[52] U.S. Cl. ............................................... 157/1.24
[51] Int. Cl. ............................................ B60c 25/06
[58] Field of Search ......... 157/1.1, 1.11, 1.13, 1.14, 157/1.17, 1.2, 1.22, 1.24, 1.3, 1.33

[56] References Cited
UNITED STATES PATENTS

| | | | |
|---|---|---|---|
| 3,528,475 | 9/1970 | Duquesne | 157/1.24 |
| 2,845,969 | 8/1958 | Duquesne | 157/1.24 |
| 3,517,723 | 6/1970 | Hogg et al. | 157/1.24 |
| 3,238,989 | 3/1966 | Silvestrani | 157/1.24 |
| 3,493,030 | 2/1970 | Strang et al. | 157/1.24 |

Primary Examiner—Granville Y. Custer, Jr.
Assistant Examiner—Harold P. Smith, Jr.

[57] ABSTRACT

A device for removing or mounting vehicle tires relative to a wheel therefore and having driven means for clamping and rotating the wheel in opposite directions and an arm having tire removing and mounting tools at opposite ends which arm can be positioned and held with either tool against the tire for the intended purpose whereby rotation of the wheel will remove or mount the tire on the wheel.

5 Claims, 11 Drawing Figures

PATENTED FEB 12 1974

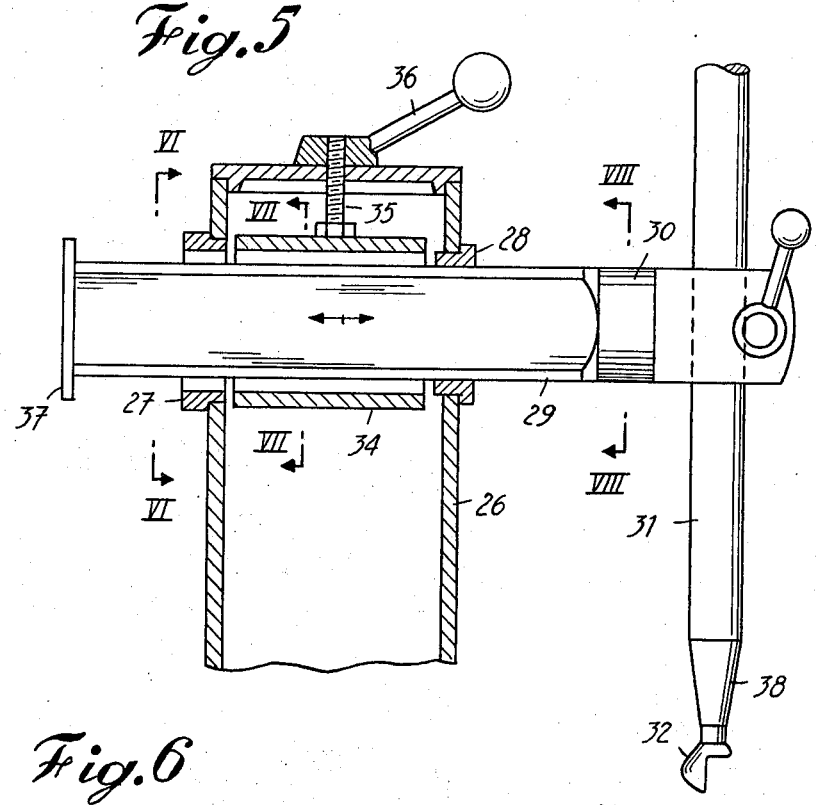
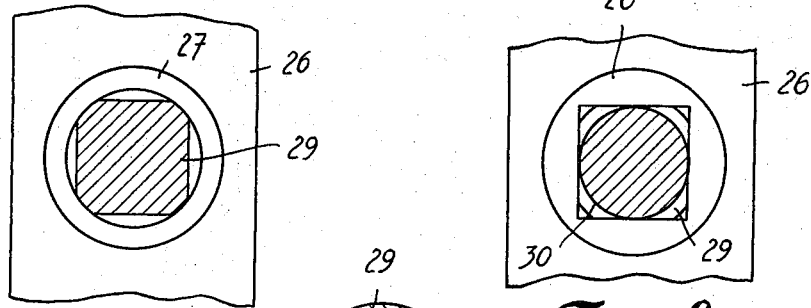
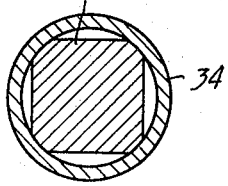

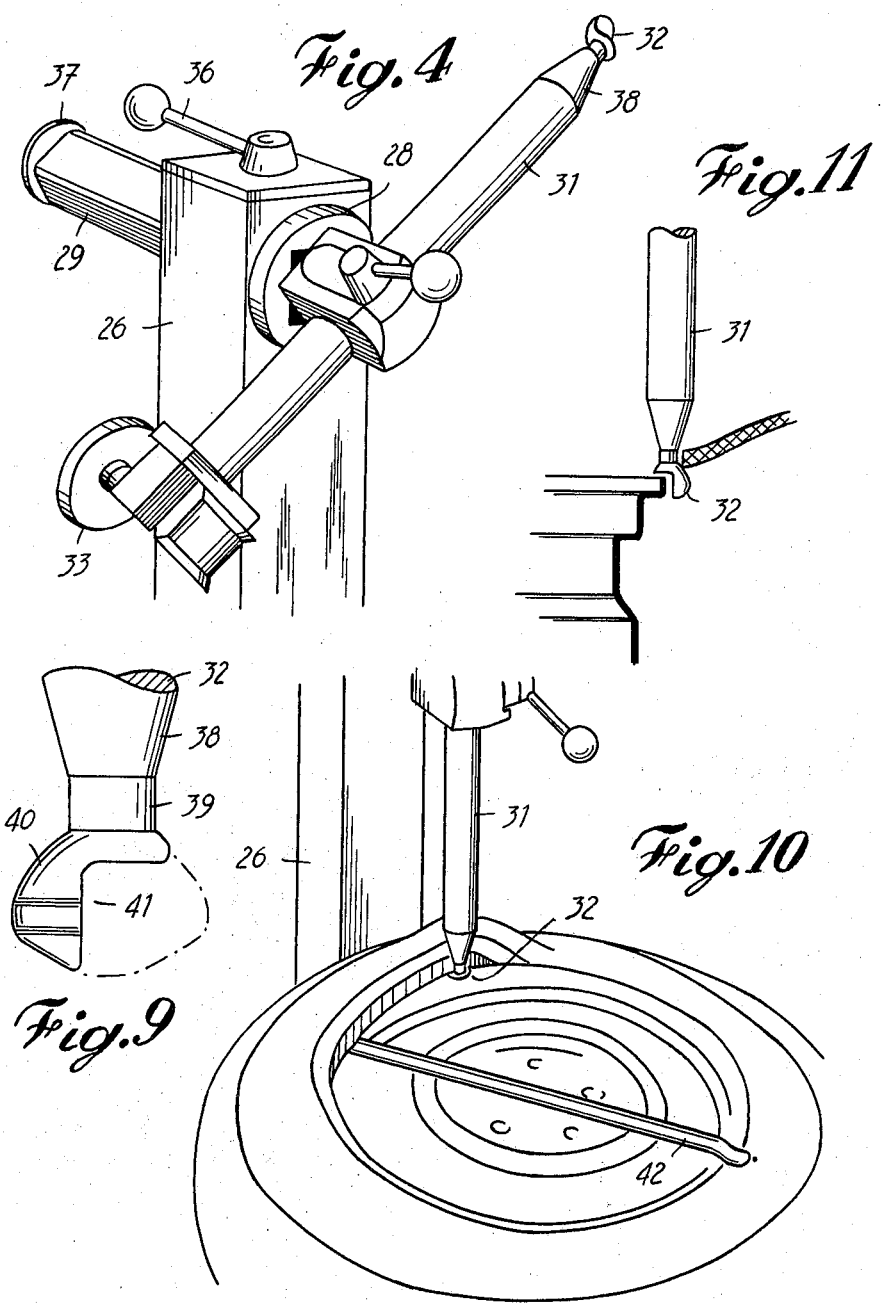

DEVICE FOR FITTING AND REMOVING OF TIRE WHICH EQUIP THE WHEELS OF MOTOR VEHICLES

The invention is concerned with a completely automatic device for fitting and removing the tires which equip the wheels of motor vehicles.

Devices of this sort exist and comprise jaws which can be displaced in a horizontal plane in order to clamp the wheel, a turntable for displacing the wheel with respect to a tool in view of removing or fitting the tire which equips aforesaid wheel, a common driving mechanism for moving the jaws and causing the rotation of the turntable, a stand with a vertical column and a horizontal arm fitted with a rod which is vertically mobile in said arm and which carries the fitting and removing tools for the tire which equips the wheel fixed upon aforesaid turntable.

These known devices do however have the disadvantage of requiring guide elements for the jaws, which makes their construction complicated and costly, and in certain cases leads to an important clearance between the guide elements and the jaws.

Similarly, these devices generally have the disadvantage of bringing the fitting or removing tool into contact with the wheel, often damaging the latter. The removal tool generally consists of several parts which makes it both complicated and costly to construct.

The purpose of the present invention is to create a relatively simple and rational device, which is unlikely to be damaged, at proportionally low cost.

For this purpose, according to the main principle of the invention, the device fundamentally comprises a common mechanism for the displacement of the jaws and the drive of the turntable, mechanism which consists of a shaft which is solidly fixed to a gear which engages several pinions, each fitted with an arm which is equipped with a jaw for clamping the wheel. Means are provided between the horizontal arm and the vertical column which permit axial sliding of the horizontal arm in the column, rotation and blockage of same, so that the tool fitted in the arm may be brought to its operating position. The tool for removing a tire is part of a rod which can be displaced vertically in the horizontal bar. This tool has a conical part, a cylindrical part and a part in the shape of a double cone which is provided with an angular cavity in transverse direction with respect to the axis of the rod.

Merely as an example, and without the slightest character of limitation, a detailed description is given below of a device according to the present invention. This description refers to the appended drawings in which:

FIG. 4 is a perspective view of the vertical column and of the device for supporting the tools required for fitting and removing a tire;

FIG. 5 is a longitudinal cross-section of the column with the removal tool;

FIGS. 6, 7 and 8 show cross-sections according to lines VI — VI, VII — VII and VIII — VIII of FIG. 5;

FIG. 9 is a side view, at larger scale, of the tool head for removing a tire;

FIG. 10 is a prespective view of a wheel with tire and of the tool required for removing the latter, and FIG. 11 is a cross-section of a wheel, also showing the exact position taken, with respect to the latter, of the tool for removing the tire.

Figure 1:
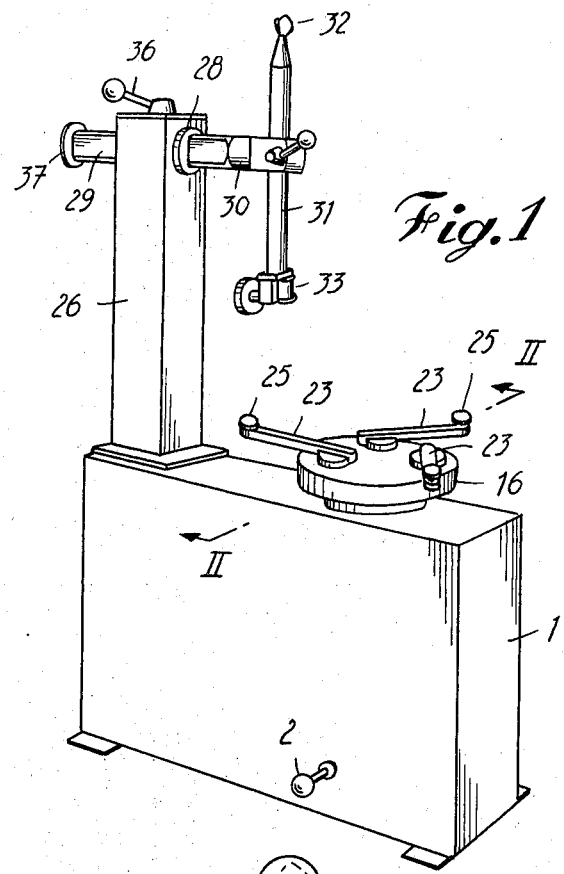
FIG. 1 is a perspective view of the device.
Figure 3:
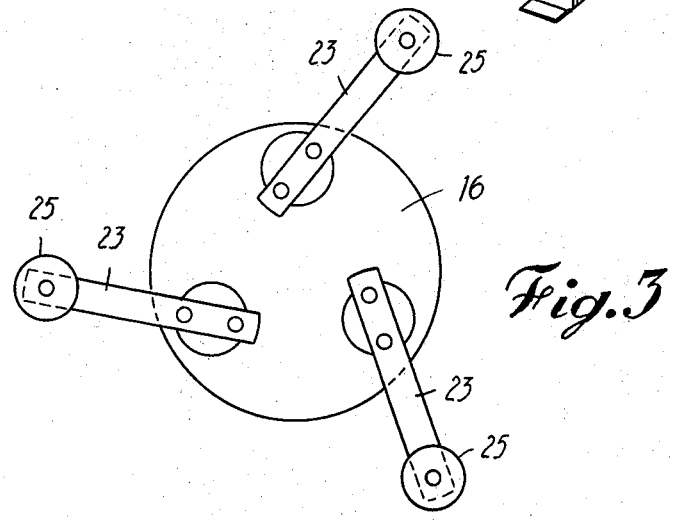
FIG. 3 is a top view of the device, at a smaller scale.
Figure 2:
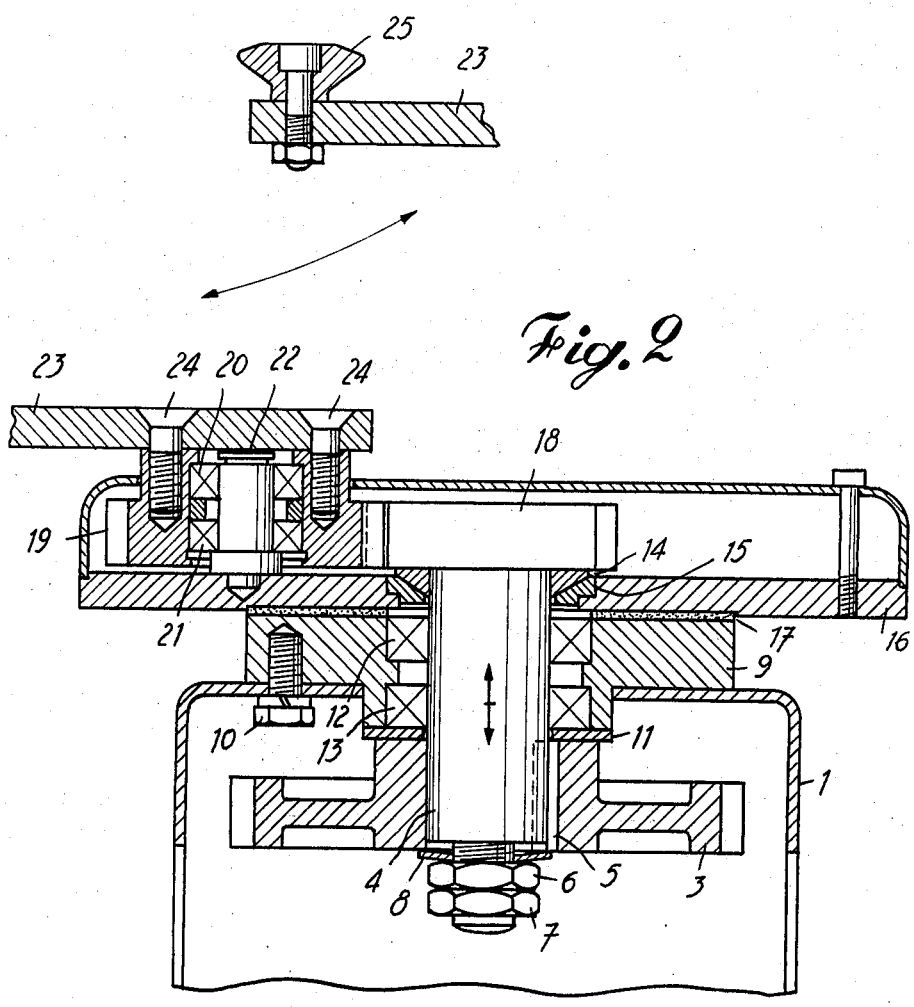
FIG. 2 is a tranverse cross-section, at a larger scale, of the device for clamping the wheel, according to line II — II of FIG. 1.

The device according to the invention consists of a chassis 1 in which an electric motor is fitted (not shown), which, according to the position into which pedal 2 is pushed, may turn in either sense. By means of a reduction gear (not shown), the motor drives gear 3 which is fitted on shaft 4 by means of a key 5, an elastic clamping ring 8, a nut 6 and a lock-nut 7. Between gear 3 and collar 9 which is attached to the chassis 1 by bolts 10, a sliding washer 11 is fitted. Shaft 4 can slide axially in roller bearings 12, 13 which are contained within collar 9. Towards the top this shaft 4 is fitted with a sliding stop 14 which cooperates with a lower stop 15, fitted in turntable 16. This table rests upon a friction disk 17 which itself rests on top of collar 9. the top end of shaft 4 carries a gear 18 which engages three pinions 19, each fitted by means of ball bearings 20 – 21 upon a pivot 22 which is fixed in turntable 16. An arm 23 is fixed by means of screws 24 upon each pinion 19, the free end of each arm being provided with a clamping jaw 25 used for gripping the wheel. The desired pressure between turntable 16, friction disk 17 and collar 9 is maintained by the collapse of elastic tightening washer 8, which is adjustable by means of nuts 6 – 7. This pressure is essential for maintaining table 16 at a standstill, while shaft 4 is being driven, up to the moment when jaws 25 come to press against the wheel which is placed on arms 23. At that moment, the entire assembly, table 16 and the wheel, are driven into rotation.

For fixing a wheel, the latter is placed upon arms 23 between clamping jaws 25 and the motor is started by pushing down on pedal 2. Gear 3 thus rotates shaft 4 and gear 18. The latter then drives the three pinions 19 so that arms 23 are displaced inwardly, until clamping jaws 25 come to press against the outer circumference of the wheel rim. Jaws 25 being thus jammed, pinions 19 can no longer rotate and gear 18, persuing its rotation, exerts a pressure upon blocked pinions 19, thus driving turntable 16 and the wheel in rotation. Consequently the tire is moved so that its entire circumference passes before the fitting and removing tool.

When the wheel has to be released, the motor is rotated in the other sense by lifting pedal 2, so that arms 23 are displaced towards the outside, thus liberating the wheel.

For fitting a tire, the operations are carried out in the same manner, except that use is made of the fitting tool.

A hollow column 26 is fixed upon chassis 1. In this column two openings are provided opposite to each other. One of these openings consists of a bushing 27 with a circular passage, whereas the other bushing 28 has a passage with square cross-section. An arm 29 can move axially through these bushings and has a square transverse cross-section with rounded off edges. This arm is provided with a circular portion 30, the diameter of which is equal to the thickness of the arm, so that when arm 29 is displaced axially until its cylindrical portion 30 locates in bushing 28, it becomes possible to rotate said arm around its axis. This arrangement is such that rod 31, which passes through arm 29 and can be displaced axially or fixed in it, may be rotated by 180° so that either removing tool 32 or fitting tool 33 can at will be brought into the operating position, respectively for removing a tire or for fitting one. In order to be able to fix mobile arm 29, the latter, inside column 26, passes through a sleeve 34 which is provided with a threaded rod 35 upon which a nut is screwed which is operated by a handle 36, so as to be able to exert a pull upon arm 29, thus causing the jamming of said arm whithin bushes 27 and 28. An end plate 37 is fixed to arm 29, so as to prevent the latter from sliding out of column 26.

Tool 32 for removing a tire has a conical part 38, a cylindrical part 39 for guiding the bead of the tire to be removed and a head 40 which fundamentally consists of a double cone and allows the tire to be removed gradually from the wheel. An angular cavity 41 is provided in head 40 for the purpose of making the latter as thin as possible. In this manner the distance between the edge of the rim and the bead of the tire to be removed is reduced to a minimum, so that the tire bead can easily be brought over head 40 without the latter touching the wheel. This tool is of economical and rational construction. To start with it is indeed turned out of stock so as to take the shape shown in FIG. 9, partially in full line and partially in dot-dash line, after which cavity 41 is machined away. The fabrication of this tool thus only required two operations.

For removing a tire, the wheel being attached upon arms 23, rod 31 is pivoted around by 180°, by rotating arm 29 as previously described, and is displaced in height so that tool 32 locates at a small distance from the wheel rim, without coming into contact with it (see FIG. 11). Lever 42 is next entered between the tire bead and the rim, in order to place the bead upon head 40 of tool 32. Pedal 2 is next pushed down, so that the wheel which is clamped between jaws 25 starts to rotate with table 16. The tire bead is thus gradually detached from the wheel over its entire circumference.

It is quite obvious that the shape, the dimensions and the relative locations of the described parts may be modified, providing they remain within the scope of the invention, and that certain of the parts described may even be replaced by others which perform the same functions.

I claim:

1. A device for removing and fitting tires on wheels of motor vehicles, which device comprises a driven vertical shaft, a gear fixedly mounted on said shaft, a plurality of pinions engaging said gear, an arm fitted on each pinion, a jaw on each arm and displaceable in a horizontal plane by said pinion for retaining the wheel, a common driving element frictionally engaging said gear and rotatably supporting said pinion and capable of rotating with said gear and rotating said pinions for the purpose of the displacement of said jaws and the rotation of said jaws with the wheel, a chassis, a vertical column on said chassis, a horizontal arm traversing said column, means provided between said vertical column and said horizontal arm permitting the arm to slide axially in said column and to rotate and to fix said arm in said column, a rod fitted with tire removal and fitting tools, which rod is displaceable in height in said horizontal arm whereby said rod can be brought into operating position by said horizontal arm, said tool for removing the tires comprises a conical part, a cylindrical part and a part in the shape of a double cone which is provided with an angular cavity in transverse direction with respect to the axis of said rod.

2. A device as defined in claim 1, in which said driving element is a housing which serves as turntable, and each of said pinions is provided at the top with an extension which passes through said housing and upon which extension the arm of the pinion which bears one of said jaws, is fitted.

3. A device as defined in claim 2, in which a friction disc is fitted between said turntable and said chassis, and means are provided for maintaining a pressure between said turntable and said chassis.

4. A device as defined in claim 1, in which said horizontal arm has a square transverse cross-section with rounded off edges as well as a portion which is of cylindrical shape, one bushing having a circular opening is mounted in said column, a second bushing with a square opening is also mounted in said column, both bushings are fitted opposite to each other in said vertical column with said horizontal arm extending therethrough in such a manner that said arm can only rotate when its cylindrically shaped part is located in said second bushing with a square opening.

5. A device as defined in claim 4, in which said sleeve in said column having said horizontal arm extending therethrough and means for moving said sleeve laterally of said horizontal arm for fixing said horizontal arm within said two bushings.

* * * * *